(12) United States Patent
Wong

(10) Patent No.: US 6,928,573 B2
(45) Date of Patent: Aug. 9, 2005

(54) COMMUNICATION CLOCKING CONVERSION TECHNIQUES

(75) Inventor: Wee Mon Wong, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 660 days.

(21) Appl. No.: 09/989,267

(22) Filed: Nov. 20, 2001

(65) Prior Publication Data

US 2003/0097600 A1 May 22, 2003

(51) Int. Cl.$^7$ ................................................ G06F 1/08
(52) U.S. Cl. ..................... 713/500; 713/600; 710/71; 326/93; 327/176
(58) Field of Search ............................... 713/400, 500, 713/502, 503, 600; 710/61, 71; 341/50, 100, 101; 375/377; 326/93; 327/100, 176; 370/366, 545

(56) References Cited

U.S. PATENT DOCUMENTS

| | | | | | |
|---|---|---|---|---|---|
| 4,607,345 A | * | 8/1986 | Mehta | ......................... | 710/61 |
| 5,425,062 A | * | 6/1995 | Boop | ......................... | 375/377 |
| 5,706,438 A | * | 1/1998 | Choi et al. | ..................... | 710/71 |
| 6,480,512 B1 | * | 11/2002 | Ahn | ........................... | 370/545 |

* cited by examiner

Primary Examiner—Thuan Du
(74) Attorney, Agent, or Firm—McAndrews, Held & Malloy, Ltd.

(57) ABSTRACT

A plurality of groups of first flip-flops (group 40 of flip-flops A1–An–1 for each of channels CIA–CIC) store input data clocked in response to first clock signals (A–C). First enable signals (Stack_en) are generated for each group of first flip-flops. A plurality of groups of second flip-flops (group 60 of flip-flops B1–Bn for each of channels CIA–CIC) store the input data from the first flip-flops in response to the first enable signals and first clock signals. A second enable signal (Slide_en) is generated in response to a second clock signal (D) and the first enable signal. A plurality of groups of third flip-flops (group 80 for each of channels CIA–CIC) store the data in response to the second enable signal and second clock signal. The data is transmitted in serial form at the rate of the second clock signal.

36 Claims, 4 Drawing Sheets

Clock A
Clock D

Clock B
Clock D

Clock C
Clock D

COMMUNICATION CLOCKING CONVERSION TECHNIQUES

BACKGROUND OF THE INVENTION

This invention relates to clocking conversion in communication systems, and more particularly relates to converting data clocked within a first speed range to data clocked within a higher speed range or within the same speed range.

Many applications in digital communication systems require converting a slower input clock rate to a higher system clock rate to increase performance. When two independent clocks are present in a design or system, there will always be an unknown phase difference between the two clock sources. When the independent clocks operate at different frequencies, the frequency difference will cause the clocks to move in both time and phase relationship to each other. Traditionally data synchronization in such systems requires extra memory in the form of an asynchronous FIFO or a ping-pong buffer with complex control logic. This invention addresses these deficiencies of the traditional approaches and provides a solution.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

One apparatus embodiment of the invention is useful for converting serial data clocked in response to a first clock signal having cycles occurring at a first rate to serial data clocked in response to a second clock signal having cycles occurring at a second rate, the second rate being equal to or greater than the first rate. In such an environment, the apparatus comprises first flip-flops arranged to store the data clocked in response to the first clock signal. A first signal generator responsive to the first clock signal is arranged to generate a first enable signal after a predetermined number of cycles of the first clock signal dependant on the number of first flip-flops.

Second flip-flops responsive to the first enable signal and the first clock signal are arranged to store the data. A second signal generator is arranged to generate a second enable signal in response to the second clock signal and the first enable signal. Third flip-flops are arranged to store the data in response to the second enable signal and the second clock signal. A multiplexer is arranged to transmit the data in serial form from the third flip-flops at the second rate.

One method embodiment of the invention is useful for converting serial data clocked in response to a first clock signal having cycles occurring at the first rate to serial data clocked in response to a second clock signal having cycles occurring at a second rate, the second rate being equal to or greater than the first rate. In such an environment, the method comprises storing the data clocked in response to the first clock signal. A first enable signal is generated after a predetermined number of cycles of the first clock signal dependant on the number of bits of the data stored. The data is stored in response to the first enable signal and the first clock signal. A second enable signal is generated in response to the second clock signal and the first enable signal. The data is stored in response to the second enable signal and the second clock signal. The data is transmitted in serial form at the second rate in response to the second clock signal.

A second apparatus embodiment of the invention is useful in a data communication system comprising a plurality of channels receiving serial input data clocked in response to a plurality of first clock signals having cycles occurring at a plurality of different first rates. In such an environment, serial input data can be converted to serial data clocked in response to a second clock signal having cycles occurring at a second rate, the second rate being equal to or greater than each of the first rates, by apparatus comprising a plurality of groups of first flip-flops arranged to store the input data clocked in response to the first clock signals, each group of first flip-flops corresponding to one of the channels. A first signal generator responsive to the first clock signals generates first enable signals, each first enable signal corresponding to one group the first flip-flops. A plurality of groups of second flip-flops responsive to the first enable signals and the first clock signals store the input data, each group of second flip-flops corresponding to one group of the first flip-flops. A second signal generator responsive to the second clock signal and at least one of first enable signals generates a second enable signal. A plurality of groups of third flip-flops responsive to the second enable signal and the second clock signal store the input data, each group of third flip-flops corresponding to one group of second flip-flops. A multiplexer is arranged to transmit the input data in serial form from the third flip-flops at the second rate.

A second method embodiment of the invention is useful in a data communication system comprising a plurality of channels receiving serial input data clocked in response to a plurality of first clock signals having cycles occurring at a plurality of different first rates. In such an environment, serial input data can be converted to serial data clocked in response to a second clock signal having cycles occurring at a second rate, the second rate being equal to or greater than each of the first rates, by a method comprising storing the input data clocked in response to the first clock signals separately for each channel. First enable signals are generated in response to the first clock signals, each first enable signal corresponding to one of the channels. The input data are stored in response to the first enable signals and the first clock signals separately for each channel. A second enable signal is generated in response to the second clock signal and at least one of first enable signals. The input data are stored in response to the second enable signal and the second clock signal separately for each channel. The stored input data are transmitted in serial form at the second rate.

By using the foregoing techniques, data can be converted to a higher rate with a degree of reliability and ease previously unavailable. For applications in which the data is received in multiple channels at different clock rates, only one second clock signal is needed for all channels.

These and other advantages and novel features of the present invention, as well as details of an illustrated embodiment thereof, will be more fully understood from the following description and drawings.

DETAILED DESCRIPTION OF THE INVENTION

Figure 1:
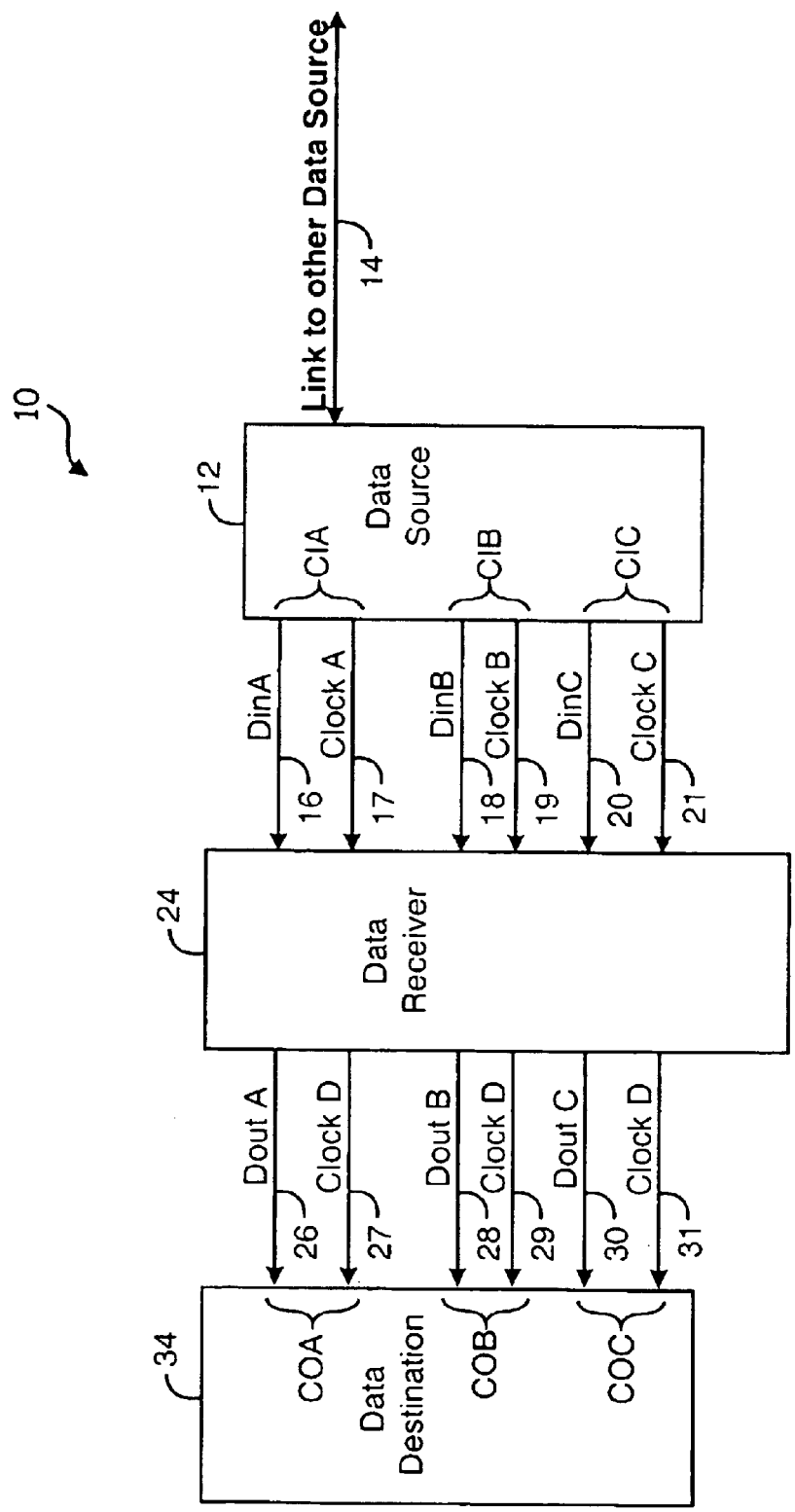
FIG. 1 is a schematic block diagram of one embodiment of the invention employing a data receiver receiving multiple input data channels clocked a different clock rates.

Referring to FIG. 1, a communication system 10 includes a data source 12, which provides data over multiple input channels CIA, CIB and CIC through communication lines 16–21 to a data receiver 24. At least some of the channels may be clocked at different rates. For example, input channel CIA transmitted over lines 16 and 17 provides data DinA on line 16 that is clocked by a clock signal A on line 17. Input channel CIB transmitted over lines 18 and 19 provides data DinB on line 18 that is clocked by a clock signal B on line 19. Input channel CIC transmitted over lines 20 and 21 provides data DinC on line 20 that is clocked by a clock signal C on line 21. Data source 12 may be linked to other data sources over a communication link 14 as shown.

Once a data link is established, data source 12 transmits data DinA together with clock signal A, data DinB, together with clock signal B, and data DinC, together with clock signal C. The rate of DinA, DinB, DinC, clock signal A, clock signal B and clock signal C vary depending on the transmission rate of the data source. For example, the rates of the transmission rates of the data on lines 16–21 could range from 4 Mbits/sec to 25 Mbits/sec.

Receiver 24 converts the data to a clock rate that is higher than or equal to the rates of clock signals A–C. The converted data is transmitted over output channels COA, COB and COC on lines 26–31 to a data destination 34. Typically, receiver 24 uses a single clock signal D to transmit the data over output lines 26–31. Typically the rate of clock signal D is fixed as determined by the system clock of data destination 34. For example, receiver 24 and data destination 34 may be operating at 50 MHz in order to increase the performance. Thus, clock signal D would have clock cycles occurring at the rate of 50 MHz. However, clock signals A–C typically have cycles that occur at lower rates. For example, clock signals A–C may have rates that are one-half to one-quarter of the rate of clock signal D. It is therefore necessary that data receiver 24 convert the input clock rates of clock signals A–C to the output clock rates of clock signal D.

Output channel COA transmitted over lines 26 and 27 provides data DoutA on line 26 that is clocked by clock signal D on line 27. Output channel COB transmitted over lines 28 and 29 provides data DoutB on line 28 that is clocked by clock signal D on line 29. Output channel COC transmitted over lines 30 and 31 provides data DoutC on line 30 that is clocked by clock signal D on line 31. Out put channels COA, COB and COC correspond with input channels CIA, CIB and CIC, respectively.

Figure 2:
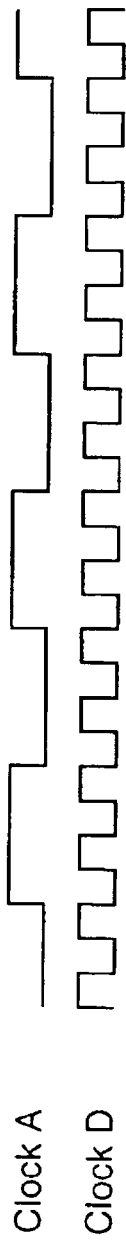
FIGS. 2–4 are timing diagrams showing exemplary relationships between the rates of clock signals useable in the embodiment shown in FIG. 1.
Figure 3:
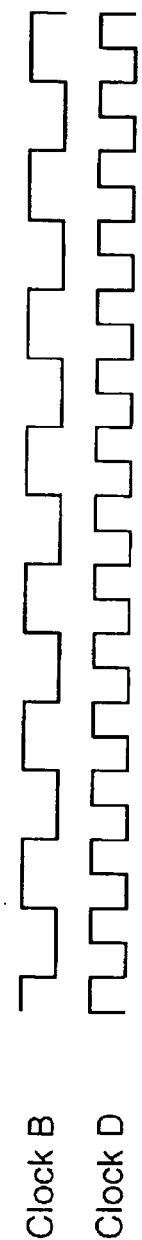
Figure 4:
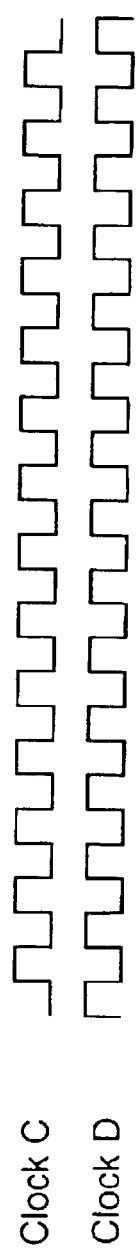

FIG. 2 illustrates the case in which the cycles of clock signal D occur at four times the rate of the cycles of clock signal A. FIG. 3 illustrates the case in which the cycles of clock signal D occur at two times the rate of the cycles of clock signal B. FIG. 4 illustrates the case in which the cycles of clock signal D occur at the same rate as the cycles of clock signal C. Although no phase difference is shown between the signals in FIGS. 2–4, in practice, there may be phase differences. The illustrated embodiment of the invention automatically compensates for any such phase differences.

Figure 5:
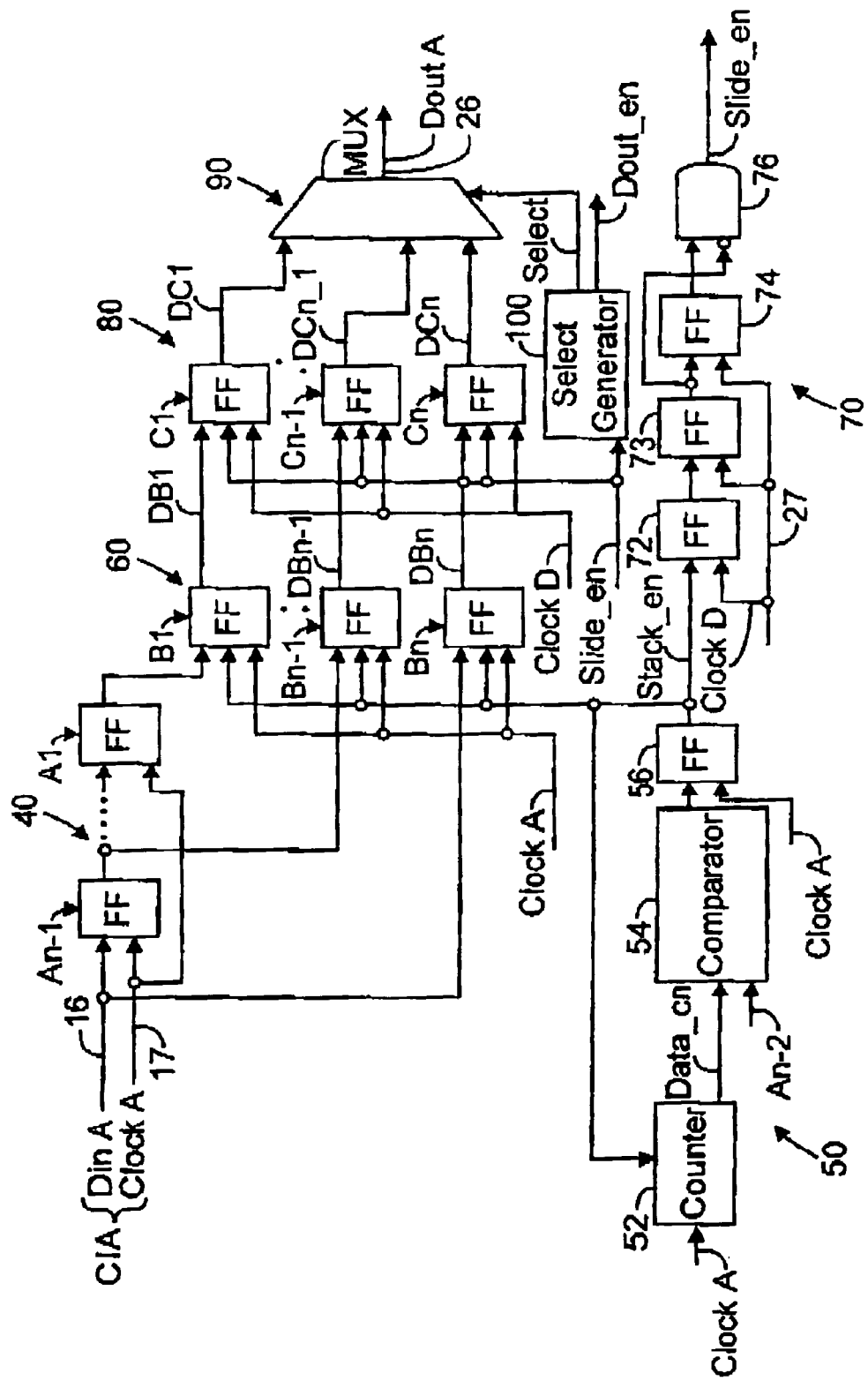
FIG. 5 is a schematic block diagram of the circuitry used in one channel of the data receiver shown in FIG. 1.

FIG. 5 illustrates one embodiment of circuitry within receiver 24 that processes the data received on input channel CIA and generates the data transmitted on output channel COA. Circuitry identical to the circuitry shown in FIG. 5 also is provided for channels CIB and CIC. The circuitry for channels CIB and CIC can be understood from the following description of the circuitry for channel CIA.

Still referring to FIG. 5, in general, input data is pipelined in a serial chain of n flip-flops. Once n number of input data bits is reached, the piped-lined data is then "pushed down" to another group of flip-flops according to the input clock. In the mean time, the stacked data is caused to "slide out" into a group of flip-flops, which are later read with system clock signal D. The value n depends on the difference between system clock frequency D and maximum input clock frequency.

Still referring to FIG. 5, asynchronous serial data DinA received on line 16 is pipe-lined through and serially stored in a group 40 of flip-flops A1 to An–1 over about n–1 cycles of clock signal A. In the mean time, a signal generator 50, including a counter 52, a comparator 54 and a flip-flop 56, detects the number of data bits pipe-lined into the chain of flip-flops A1 . . . An–1 by counting cycles of clock signal A. Once the number of input data bits reaches n–1, a Stack_en enable signal is generated as a logical high signal, and counter 52 is reset to zero. The Stack_en signal enables a second group 60 of flip-flops B1 . . . Bn. The current DinA data bit is registered into flip-flop Bn and the DA1 . . . DAn–1 data bits (i.e., the data bits stored in flip-flops A1 . . . An–1) are stored in flip-flops B1 . . . Bn–1, respectively, in response to the Stack_en signal and clock signal A.

The value of n depends on the difference between the maximum rate of clock signals A–C and the rate of clock D. For example, assuming that the rate of clock signal A is the maximum of the rates of clock signals A–C, n will be 3, if the rate of clock signal D is greater than or equal to the maximum rate of clock signal A and the rate of clock signal D is less than the two times the maximum rate of clock signal A. If the rate of clock signal D is greater than or equal to the two times the maximum rate of clock signal A and the rate of Clock D is less than four times the maximum rate of clock signal A, n will be 2.

A signal generator 70 uses three flip-flops 72–74, a logic gate 76, the Stack_en signal and clock signal D to generate enable signal Slide_en, which enables a group 80 of flip-flops C1 . . . Cn. The outputs DB1 . . . DBn of flip-flops B1 . . . Bn connect to the inputs of flip-flops C1 . . . Cn. The outputs DC1 . . . DCn of flip-flops C1 . . . Cn are connected to the input of a multiplexer 90. The Slide_en signal also enables a select generator 100 to generate Select and Dout_en signals. The Select signal causes multiplexer 90 to transmit the bit stored in flip-flop C1 first and the bit stored in flip-flop Cn last. Thus, data is read from outputs DC1 through DCn one-bit-at-a-time in succession.

Figure 6:
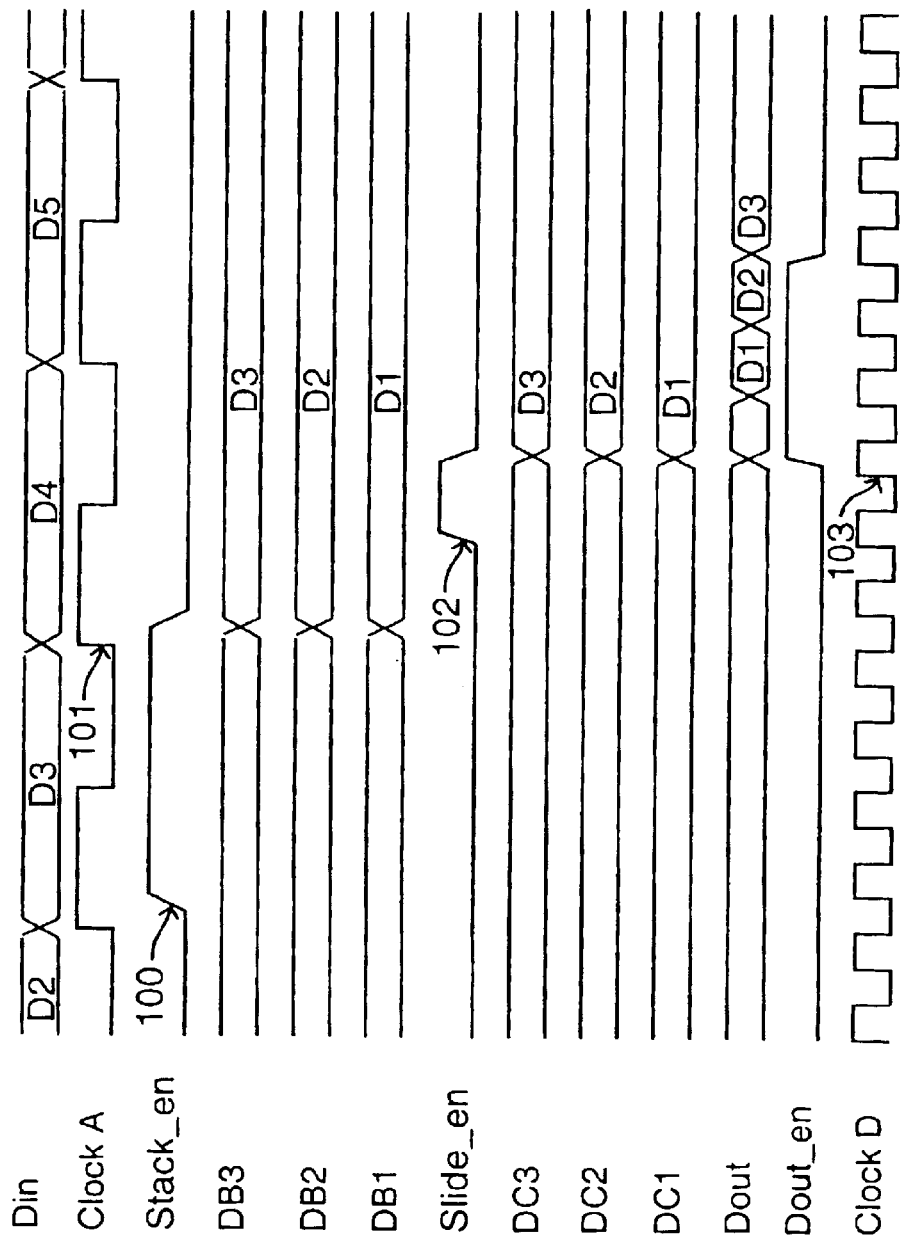
FIG. 6 is a timing diagram showing the signals appearing at various points in the circuitry shown in FIG. 5.

Assume n is 3. For the examples shown in FIGS. 2–4, n is 3 or less. Referring to FIGS. 5–6, the Stack_en signal 100 is high when Din is D3. The data stored in flip-flops A1, A2, and the Din data bit are registered into flip-flops B1 . . . B3 at clock signal A cycle 101. That is, data is stored in group 60 flip-flops in a single cycle of clock signal A. Slide_en signal 102 is generated a few cycles of clock signal D after the beginning of clock signal A cycle 101. Slide_en signal 102 enables outputs DB1 . . . DB3 to "slide" to and be stored in flip-flops C1 . . . C3 of group 80 in response to clock D cycle 103. Thus, data is stored in flip-flops C1–Cn in response to a single clock cycle of clock signal D.

The outputs DC1 . . . DC3 of flip-flops C1 . . . C3 are multiplexed out by the Select signal, which is generated by select generator 100. The converted output data DoutA, together with the Dout_en signal, are used by the data destination 34 for further data processing.

Still referring to FIG. 6, the DinA data is clocked in response to the clock signal A and is stored serially in flip-flops A1 . . . An–1. Enable signal Stack_en is generated after a number of cycles of the clock signal A dependant on the number of bits of the data stored in flip-flops A1 . . .

An−1. The data from flip-flops A1 . . . An−1 is stored in parallel in flip-flops B1–Bn in response to enable signal Stack_en and the clock signal A. Enable signal Slide_en is generated in response to clock signal D and enable signal Stack_en. The data stored in flip-flops B1 . . . Bn is stored in parallel in flip-flops C1–Cn in response to enable signal Slide_en and clock signal D. The data is transmitted in serial form through line 26 at the rate of clock signal D in response to clock signal D.

As previously stated, the circuitry shown in FIG. 5 is duplicated for channels CIB and CIC. However, clock signal A shown in FIG. 5 would become clock signal B for channel CIB and would become clock signal C for channel C. For some applications, clock signals D transmitted on lines 27, 29 and 31 may be transmitted on a single line.

For the example of data communication system 10 in which channels CIA–CIC receive serial input data clocked in response to clock signals A–C having cycles occurring at a plurality of different rates, the serial input data DinA–DinC is converted to serial output data DoutA–DoutC clocked in response to clock signal D having cycles occurring at a second rate, which is equal to or greater than each of the rates for clock signals A–C. A plurality of groups of first flip-flops (group 40 of flip-flops A1–An−1 for each of channels CIA–CIC) stores the input data clocked in response to clock signals (A–C). Each group of flip-flops A1–An−1 corresponds to one of channels CIA–CIC. Signal generators 50 for each of the channels are responsive to clock signals (A–C) to generate enable signals Stack_en for each of the channels and each of the groups of flip-flops A1–An−1. A plurality of groups of second flip-flops (group 60 of flip-flops B1–Bn for each of channels CIA–CIC) are responsive to the first enable signals Stack_en and the first clock signals (A–C) to store the input data. Each group of second flip-flops B1–Bn corresponds to one group of the first flip-flops A1–An−1. Signal generator 70 is responsive to clock signal D and at least one of first enable signals Stack_en for one of the channels to generate enable signal Slide_en. A plurality of groups of third flip-flops (group 80 of flip-flops C1–Cn for each of channels CIA–CIC) are responsive to enable signal Slide_en and clock signal D to store the input data. Each group of third flip-flops corresponds to one group of the second flip-flops. A plurality of multiplexers 90, one for each of the channels, are arranged to transmit the input data in serial form from the third flip-flops at the rate of clock signal D to output channels COA–COC. By using this arrangement, only one clock signal D needs to be generated for all of the channels.

While the invention has been described with reference to one or more preferred embodiments, those skilled in the art will understand that changes may be made and equivalents may be substituted without departing from the scope of the invention. In addition, many modifications may be made to adapt a particular step, structure, or material to the teachings of the invention without departing from its scope. Therefore, it is intended that the invention not be limited to the particular embodiment disclosed, but that the invention will include all embodiments falling within the scope of the appended claims.

What is claimed is:

1. Apparatus for converting serial data clocked in response to a first clock signal having cycles occurring at a first rate to serial data clocked in response to a second clock signal having cycles occurring at a second rate, the second rate being equal to or greater than the first rate, the apparatus comprising:

first flip-flops arranged to store the data clocked in response to the first clock signal;

a first signal generator responsive to the first clock signal arranged to generate a first enable signal after a predetermined number of cycles of the first clock signal dependant on the number of first flip-flops;

second flip-flops responsive to the first enable signal and the first clock signal arranged to store the data;

a second signal generator arranged to generate a second enable signal in response to the second clock signal and the first enable signal;

third flip-flops arranged to store the data in response to the second enable signal and the second clock signal; and a multiplexer arranged to transmit the data in serial form from the third flip-flops at the second rate.

2. The apparatus of claim 1 wherein the first flip-flops comprise a serial chain of flip-flops arranged so that the data is stored in the first flip-flops in response to a plurality of cycles of the first clock signal.

3. The apparatus of claim 1 wherein the second flip-flops are arranged so that the data is stored in the second flip-flops in response to a single cycle of the first clock signal.

4. The apparatus of claim 1 wherein the third flip-flops are arranged so that the data is stored in the third flip-flops in response to a single cycle of the second clock signal.

5. The apparatus of claim 1 wherein the first signal generator comprises a counter and a comparator arranged to generate the first enable signal in response to the predetermined number of cycles.

6. The apparatus of claim 1 wherein the second signal generator comprises flip-flops arranged to count a predetermined number of cycles of the second clock signal before generating the second enable signal.

7. The apparatus of claim 1 wherein the multiplexer enables transmission of data from the third flip-flops one-time-at-a-time in succession.

8. The apparatus of claim 1 wherein the number of first flip-flops is three or less.

9. A method of converting serial data clocked in response to a first clock signal having cycles occurring at the first rate to serial data clocked in response to a second clock signal having cycles occurring at a second rate, the second rate being equal to or greater than the first rate, the method comprising:

storing the data clocked in response to the first clock signal;

generating a first enable signal after a predetermined number of cycles of the first clock signal dependant on the number of bits of the data stored;

storing the data in response to the first enable signal and the first clock signal;

generating a second enable signal in response to the second clock signal and the first enable signal;

storing the data in response to the second enable signal and the second clock signal; and transmitting the data in serial form at the second rate in response to the second clock signal.

10. The method of claim 9 wherein said storing the data clocked in response to the first clock signal comprises storing the data in response to a plurality of cycles of the first clock signal.

11. The method of claim 9 wherein said storing the data in response to the first enable signal and the first clock signal comprises storing in the data in response to a single cycle of the first clock signal.

12. The method of claim 9 wherein said storing the data in response to the second enable signal and the second clock signal comprises storing the data in response to a single cycle of the second clock signal.

13. The method of claim 9 wherein said generating a first enable signal comprises:
   counting cycles of the first clock signal to generate a sum signal; and
   comparing the sum signal with the predetermined number of cycles.

14. The method of claim 9 wherein said generating a second enable signal comprises counting a predetermined number of cycles of the second clock signal before generating the second enable signal.

15. The method of claim 9 wherein said transmitting comprises transmitting the data stored in response to the second enable signal and the second clock signal one-bit-at-a-time in succession.

16. The apparatus of claim 9 wherein the number of bits of the data stored in response to the first clock signal comprises three bits or less.

17. The method of claim 9 wherein said storing the data clocked in response to the first clock signal comprises storing the data serially.

18. The method of claim 9 wherein said storing the data in response to the first enable signal and the first clock signal comprises storing the data in parallel.

19. In a data communication system comprising a plurality of channels receiving serial input data clocked in response to a plurality of first clock signals having cycles occurring at a plurality of different first rates, apparatus for converting serial input data to serial data clocked in response to a second clock signal having cycles occurring at a second rate, the second rate being equal to or greater than each of the first rates, the apparatus comprising:
   a plurality of groups of first flip-flops arranged to store the input data clocked in response to the first clock signals, each group of first flip-flops corresponding to one of the channels;
   a first signal generator responsive to the first clock signals to generate first enable signals, each first enable signal corresponding to one group the first flip-flops;
   a plurality of groups of second flip-flops responsive to the first enable signals and the first clock signals to store the input data, each group of second flip-flops corresponding to one group of the first flip-flops;
   a second signal generator responsive to the second clock signal and at least one of first enable signals to generate a second enable signal;
   a plurality of groups of third flip-flops responsive to the second enable signal and the second clock signal to store the input data, each group of third flip-flops corresponding to one group of second flip-flops; and
   a multiplexer arranged to transmit the input data in serial form from the third flip-flops at the second rate.

20. The apparatus of claim 19 wherein the first flip-flops comprise a serial chain of flip-flops arranged so that the data is stored in the first flip-flops in response to a plurality of cycles of the first clock signals.

21. The apparatus of claim 19 wherein the second flip-flops are arranged so that the data is stored in the second flip-flops in response to a single cycle of the first clock signals.

22. The apparatus of claim 19 wherein the third flip-flops are arranged so that the data is stored in the third flip-flops in response to a single cycle of the second clock signal.

23. The apparatus of claim 19 wherein the first signal generator comprises counters and comparators arranged to generate each of the first enable signals in response to a predetermined number of cycles of the one of the first clock signals.

24. The apparatus of claim 19 wherein the second signal generator comprises flip-flops arranged to count a predetermined number of cycles of the second clock signal before generating the second enable signal.

25. The apparatus of claim 19 wherein the multiplexer enables transmission of data from the third flip-flops one-time-at-a-time in succession.

26. The apparatus of claim 19 wherein the number of first flip-flops is three or less per group.

27. In a data communication system comprising a plurality of channels receiving serial input data clocked in response to a plurality of first clock signals having cycles occurring at a plurality of different first rates, a method of converting serial input data to serial data clocked in response to a second clock signal having cycles occurring at a second rate, the second rate being equal to or greater than each of the first rates, the method comprising:
   storing the input data clocked in response to the first clock signals separately for each channel;
   generating first enable signals in response to the first clock signals, each first enable signal corresponding to one of the channels;
   storing the input data in response to the first enable signals and the first clock signals separately for each channel;
   generating a second enable signal in response to the second clock signal and at least one of first enable signals;
   storing the input data in response to the second enable signal and the second clock signal separately for each channel; and
   transmitting the stored input data in serial form at the second rate.

28. The method of claim 27 wherein said storing the input data clocked in response to the first clock signals separately for each channel comprises storing the input data in response to a plurality of cycles of the first clock signals.

29. The method of claim 27 wherein said storing the input data in response to the first enable signals and the first clock signals separately for each channel comprises storing the input data in response to a single cycle of the first clock signals.

30. The method of claim 27 wherein said storing the input data in response to the second enable signal and the second clock signal separately for each channel comprises storing the input data in response to a single cycle of the second clock signal.

31. The method of claim 27 wherein said generating the first enable signals comprises counting cycles of the first clock signals and generating each of the first enable signals in response to a predetermined number of cycles of the one of the first clock signals.

32. The method of claim 27 wherein said generating the second enable signal comprises counting a predetermined number of cycles of the second clock signal before generating the second enable signal.

33. Tho method of claim 27 wherein said transmitting comprises transmitting bits of the stored data one-bit-at-a-time in succession.

34. The method of claim 27 wherein the number of bits of the input data stored in response to the first clock signals per channel is three bits or less.

35. The method of claim 27 wherein said storing the input data clocked in response to the first clock signals comprises storing the data serially.

36. The method of claim 27 wherein said storing the input data in response to the first enable signals and the first clock signals comprises storing the data in parallel.

* * * * *